3,095,360
GRISEOFULVIN PRODUCTION
Alan Rhodes, Bracknell, and Moira Patricia McGonagle, Slough, England, assignors to Glaxo Group Limited, Greenford, England, a British company
No Drawing. Filed Apr. 17, 1961, Ser. No. 103,213
Claims priority, application Great Britain Apr. 22, 1960
22 Claims. (Cl. 195—81)

This invention concerns improvements in or relating to the production of griseofulvin.

The antibiotic griseofulvin may be produced by culturing under submerged aerobic conditions a griseofulvin producing organism, generally a strain of *Penicillium patulum*, for example as described in U.S. Patent No. 2,843,527.

According to the said patent the culture medium essentially comprises a source of carbon and energy, nutrient salts and a source of assimilable nitrogen supplying to the medium between 0.04% and 0.3% by weight of the medium of assimilable nitrogen. In an improved process described in copending U.S. patent application Serial No. 10,586, filed February 24, 1960, the source of carbon and energy is added to the medium during fermentation in such amounts as to control the pH to desired predetermined values.

In the processes described above, the source of assimilable nitrogen may consist of chemically defined materials such as ammonium salts, but is preferably a complex organic substance such as corn steep liquor, oatmeal, soya bean meal etc. Such complex substances generally possess the advantage of supplying nutrients to the medium which would otherwise have to be added separately.

We have found that the rate of accretion of griseofulvin in the medium is to some extent dependent upon the presence in the culture medium of substances which are able to promote the formation or introduction of the methyl groups of the antibiotic during biosynthesis. Such substances are frequently present in complex organic nutrient sources; for example they are present in corn steep liquor and distillers solubles. In general, however, such substances are normally present in the nitrogen source in comparatively small amounts. We have found that by supplementing the medium with substances capable of introducing methyl groups improved accretion rates can be obtained, which suggests that complex nitrogen sources of the type commonly employed in antibiotic production are unable fully to meet the requirement of the mould in this regard.

For satisfactory griseofulvin production, there is an optimum and also a maximum percentage of the assimilable nitrogen supplied to the culture medium. If an attempt is made to increase the amount of substances promoting the formation of methyl groups in the medium by raising the amount of the complex nitrogen source, for example, corn steep liquor, it is found that the increased quantities of the substances present may be more than offset by the inhibitive action of excessive assimilable nitrogen, with the result that lower rather than higher accretion rates may result.

According to the present invention, therefore, we provide a process for the production of griseofulvin under submerged aerobic conditions which includes the step of culturing a griseofulvin producing organism in a culture medium therefor, said medium including a source of carbon and energy and primary source of assimilable nitrogen, and a further substance which is capable of effecting the introduction of methyl groups whereby the rate of accretion of griseofulvin in the medium is increased.

The substance capable of effecting the introduction of methyl groups may be a substance of the kind known as a "methyl donor," a substance which is biologically converted to a methyl donor e.g. by the action of moulds such as *P. patulum* or a substance which is concerned in the biosynthesis of methyl groups.

A "methyl donor" may be defined in terms of its biochemical effect as a substance which is able to undergo biological transmethylation with homocysteine to form methionine. (Baldwin: Dynamic Aspects of Biochemistry; Cambridge University Press, 1957, 3rd edition, pp. 130, 283, 284, 325 etc.) Methionine, in the form of S-adenosyl methionine is known to be concerned directly in biological methylation reactions (Baldwin, loc. cit., p. 283) but this compound is capable of acting as a primary source of nitrogen and hence when used to improve the formation of methyl groups in griseofulvin tends to raise the concentration of assimilable nitrogen and so inhibit griseofulvin accretion. Nevertheless, small additions of methionine may be advantageous provided that the nitrogen level is not greatly above the optimum value.

In general "methyl donors" possess a comparatively labile methyl group. Such methyl groups will generally be attached to a sulphur atom as in dimethylthetin or methyl xanthate or a nitrogen atom as in choline or sarcosine.

The "methyl donor" is preferably a simple substance, that is, predominantly a single chemical compound, since such substances will be substantially free from other components which may affect the fermentation. Thus, for example, it is preferable to add a choline salt e.g. choline chloride as "methyl donor" in the form of the substantially pure chemical rather than in the form of a complex organic substance in which this material may occur naturally. In particular, as indicated above, the "methyl donor" should not be a primary nitrogen source, by which term we mean a substance which is able readily to supply the whole of the nitrogen requirements of the organism.

The "methyl donor" may, according to the invention, contain nitrogen but should not be able to act as a primary nitrogen nutrient. However, the use of large quantities of nitrogen-containing methyl donor may result in depression of yield, due to the excess of nitrogen, and such large quantities should be avoided.

Choline and its esters and salts are especially suitable for use as "methyl-donors." Salts of choline include choline sulphate, bromide, bicarbonate, borate, dihydrogencitrate, gluconate, ascorbate, and, in particular, choline chloride while esters include, for example the acetate, sulphate and phosphate. The polybasic acids form esters which are usually in the form of internal salts but esters with monobasic acids such as the acetate are in the form of external salts, as with choline itself, e.g. the chloride, bromide etc. Other nitrogen containing substances which carry methyl groups may also be used, for example betaine and sarcosine. Non-nitrogenous "methyl donors" include methyl xanthate and dimethylthetin.

Substances which are concerned in the biogenesis of methyl groups, are well-known in the literature (see for example Huennekens, F. M., and Osborn, F. M., "Folic Acid Co-enzymes and One- Carbon Metabolism," Advances in Enzymology, 21, Interscience, London and New York, p. 427 and p. 431), include formaldehyde-bisulphite complex, glyoxylic acid, xanthine, L-histidine and, in particular, folic acid, di- and tetra-hydrofolic acid and their salts.

Substances which are converted to "methyl donors" by moulds include, for example, amino-ethanol and mono- and di-methylaminoethanol and their salts, which are precursors of choline.

We have found that the efficiency of different materials in donating methyl groups is variable and the correct quantity to be added to the medium can best be ascertained by preliminary experiments. Using choline chloride with corn steep liquor as the primary nitrogen source, we have found that addition of 0.1% choline chloride produces a marked increase in accretion rate at or near the optimum nitrogen level and preferably at least 0.05% by weight of choline or a salt thereof should be present. In the experiments, the results of which are given below, the optimum nitrogen level was 0.1 to 0.15% and additions of 0.1 and 0.2% of choline chloride appeared equally satisfactory.

Since the antibiotic contains chlorine a source of chlorine is required, a soluble inorganic chloride e.g. sodium or potassium chloride being suitable.

As indicated above, the percentage of assimilable nitrogen initially present in the medium has a considerable effect on the griseofulvin titre and is preferably limited. While the quantity of methyl donor present generally offsets the reduction in the accretion rate caused by the presence of high percentages of nitrogen in the medium, we find that the optimum percentage of assimilable nitrogen supplied to the medium in shake flask fermentations lies between 0.10% and 0.15% by weight, being apparently lower when "methyl donor" is added. Thus, for example, using corn steep liquor as N-source in shake flask fermentations, the optimum percentage of nitrogen is between 0.1 and 0.15% but on addition of 0.1% choline chloride, the optimum percentage of nitrogen was 0.1%, when an increase in griseofulvin titre of up to 35% on the 12th day of culture was observed. The titre increase when 0.15% or 0.20% nitrogen was added was much smaller.

On the other hand, the percentage of assimilable nitrogen initially present in the medium should be sufficient to support growth of the organism and is advantageously not less than 0.075% by weight.

The "methyl donor" may be added at the beginning of the fermentation or at a later stage. It is preferable that the addition be made at or about the 96th hour of fermentation.

It is necessary to sterilise all the components of the culture medium and in sterilising choline salts, we have found that both Seitz filtration and autoclaving may be used.

In carrying out the present invention the preferred primary sources of assimilable nitrogen are complex organic materials e.g. of the type commonly used in antibiotic production e.g. corn steep liquor, soya bean meal, oatmeal, cottonseed meal, distillers solubles etc. Simple nitrogen containing material e.g. nitrogenous salts such as sodium nitrate may also be used. The source of carbon and energy is preferably a sugar, e.g. glucose, lactose, hydrolysed starch etc. The amount of carbohydrate used is preferably at least 3.5% and advantageously at least 5%. The medium should also have preferably an added source of chloride ions e.g. sodium or potassium chloride. Chalk or limestone and phosphates are also beneficial. The general conditions of fermentation may thus in general be those described in Patent No. 2,843,527 and copending application Serial No. 10,586.

In order that the invention may be well understood, the following examples are given by way of illustration only:

Example 1

A mutant strain of *Penicillium patulum* was developed for 48 hours on a shaker at 25° C. in a medium containing: brown sugar (40 pieces), 2%; chalk, 1%; corn steep liquor (C.S.L.) solids, 3.8%. It was adjusted to pH 6.5 with NaOH, set out in conical flasks (60 ml. per 250 ml. flask) and autoclaved for 15 mins. at 15 p.s.i. 3 ml. of the resultant vegetative growth was used to inoculate 250 ml. conical flasks containing 60 ml. of the following fermentation medium: lactose, 7%; $KH_2PO_4$, 0.4%; KCl, 0.3%; limestone, 0.8%; C.S.L. to give either 0.1%, 0.15% or 0.2% nitrogen.

The medium was prepared by weighing the required amount of C.S.L., making up to one half the final volume with distilled water, adjusting the pH to 3.6 with 20% $H_2SO_4$ and then adding the $KH_2PO_4$, KCl, limestone and lactose in that order while making up to final volume. It was set out in conical flasks (60 ml. per 250 ml. flask) and autoclaved for 15 minutes at 15 p.s.i.

1 ml. of Seitz filtered 6% choline chloride solution was added, after autoclaving, to one half of the flasks at each nitrogen level. The flasks were then inoculated and incubated on a shaker at 25° C. for 12 days when they were harvested and assayed on the spectrophotometer.

The results of duplicate experiments *a* and *b* are shown in the following table:

*Table 1*

| Treatment | Griseofulvin, µg./ml. at day 12 | |
|---|---|---|
| | Expt. a | Expt. b |
| Nitrogen 0.1%, KCl 0.3%: (1) Lactose 7%, $KH_2PO_4$ 0.4%, limestone 0.8%. | 6295, 6141, 4069, 6141 } 5662 | 5577, 6323, 4766, 5708 } 5594 |
| As above; (2) plus 0.1% choline chloride at 0 log. hrs. | 8113, 7120, 7948, 7368 } 7637 | 6775, 7502, 6578, 6614 } 6867 |
| Nitrogen 0.15%, KCl 0.3%; (3) Lactose 7%, $KH_2PO_4$ 0.4%, limestone 0.8%. | 6372, 5681, 6954, 4512 } 5880 | 3456, 3810, 5219, 4657 } 4286 |
| As above; (4) Plus 0.1% choline chloride at 0 log. hrs. | 5919, 4512, 6996, 3767 } 5299 | 5695, 3653, 4113, 4005 } 4367 |
| Nitrogen 0.2%, KCl 0.3%; (5) Lactose 7%, $KH_2PO_4$ 0.4%, limestone 0.8%. | 3560, 3767, 4376, 2840 } 3636 | 2867, 2828, 2917, 3443 } 3014 |
| As above; (6) Plus 0.1% choline chloride at 0 log. hrs. | 4069, 4836, 4606, lost } 4504 | 2664, 2553, 3679, 3896 } 2998 |

EXAMPLE 2

Experimental details are the same as for Example 1 with the following exceptions:

(1) The organism was developed for 41 hours instead of 48 hours.

(2) C.S.L. was used to give only one level (0.1% nitrogen).

(3) Two stock solutions of choline chloride (6% and 12%) were prepared. One-half of each was Seitz filtered and one-half autoclaved. Additions of 1 ml. were made to the autoclaved fermentation broths to give:

(i) Basic medium +0.1% Seitz filtered choline chloride.
(ii) Basic medium +0.2% Seitz filtered choline chloride.
(iii) Basic medium +0.1% autoclaved choline chloride.
(iv) Basic medium +0.2% autoclaved choline chloride.

Three flasks of each treatment and of the control medium without choline chloride were harvested on each of three days (days 7, 12, 14). The broths were assayed chromatographically and spectrophotometrically and the results are shown in the following table.

Table 2

| Treatment | Griseofulvin, μg./ml. | | | | | |
|---|---|---|---|---|---|---|
| | Day 7 | | Day 12 | | Day 14 | |
| Nitrogen 0.1%, KCl 0.3%; (1) Lactose 7%, KH₂PO₄ 0.4%, limestone 0.8%. | 3271 2747 2990 | 3003 | 6234 5787 3517 | 5179 | 5525 7147 5565 | 6079 |
| (2) Plus 0.1% choline chloride (Seitz filtered) at 0 log. hrs. | 3850 2654 3701 | 3402 | 7536 6699 6252 | 6829 | 6246 5485 6326 | 6019 |
| (3) Plus 0.2% choline chloride (Seitz filtered) at 0 log. hrs. | 3663 3757 3215 | 3545 | 8132 6624 5192 | 6649 | 6446 ----- 5986 | 6216 |
| (4) Plus 0.1% choline chloride (autoclaved) at 0 log. hrs. | 3383 3962 3589 | 3645 | 5936 7946 6587 | 6823 | 6606 5705 5785 | 6032 |
| (5) Plus 0.2% choline chloride (autoclaved) at 0 log. hrs. | 3514 4374 2299 | 3396 | 6252 8169 6904 | 7108 | 3784 5585 5946 | 5105 |

EXAMPLE 3

Experimental details are the same as for Example 1 with the following exceptions:
(1) A different mutant strain of *Penicillium patulum* was used.
(2) C.S.L. was used to give only one nitrogen level (0.15% N).
(3) A number of methyl donors were added as indicated below.

Shake flasks of each treatment and of the control medium without "methyl donor" were harvested on the 10th day. The broths were assayed chromatographically and spectrophotometrically and the results are shown in the following table.

Table 3

| Treatments | Griseofulvin yield at day 10 (μg./ml.) | Mean |
|---|---|---|
| (1) 7% lactose, 0.15% nitrogen from corn-steep liquor, 0.4% KH₂PO₄, 0.2% KCl, 0.8% limestone. | 2683 3251 | 2967 |
| (2) As above plus 0.1% betaine hydrochloride at 96 hrs. | 4334 4094 | 4214 |
| (3) As above plus 0.1% sarcosine at 96 hrs. | 4111 4472 | 4291 |
| (4) As above plus 0.1% l-methionine at 96 hrs. | 3010 4042 | 3526 |
| (5) As above plus 0.1% ethanolamine at 96 hrs. | 4420 ---- | 4420 |

EXAMPLE 4

Experimental details as for Example 1 except that a different mutant strain was used, 11% lactose in lieu of 7%, and nitrogen from mixed corn-steep liquor and distillers solubles in lieu of C.S.L. alone. The results are shown in the following table.

Table 4

| Treatment | Day 17 | |
|---|---|---|
| | Griseofulvin titre, μg./ml. | Mean, μg./ml. |
| 0.075% N from corn-steep liquor +0.075% N from distillers solubles; KCl 0.3%, lactose 11%, KH₂PO₄ 0.4%, 0.8% calcium carbonate. | 8448 9188 8059 11563 | 9315 |
| As above +0.1% choline chloride at 0 hrs. | 9600 8721 10005 9803 | 9532 |
| As above +0.1% choline chloride at 48 hrs. | 9938 9397 11898 10749 | 10495 |
| As above +0.1% choline chloride at 96 hrs. | 8409 11898 10276 10861 | 10316 |

EXAMPLE 5

Experimental details as for Example 1 except that a different mutant strain was used and nitrogen (0.15%) from mixed corn-steep liquor and distillers solubles in lieu of corn-steep liquor alone. The results are shown in the following table:

Table 5

| Treatment | Mean griseofulvin yield (μg./ml.) at day 18 | |
|---|---|---|
| 0.075% from corn-steep liquor plus 0.075%N from distillers solubles; KCl 0.3%, lactose 7%, KH₂PO₄ 0.4%, 0.8% calcium carbonate. | 7887 7310 7396 | 7531 |
| As above plus 0.1% choline chloride at 0 hrs. | 8301 7963 8000 8640 | 8226 |

EXAMPLE 6

Experimental details as for Example 1 except that a different mutant strain was used, 11% lactose in lieu of 7%, and nitrogen (0.15%) from mixed corn-steep liquor and distillers solubles in lieu of corn-steep liquor alone. The results are shown in the following table.

Table 6

| Treatment | Mean griseofulvin yield at day 16 (μg./ml.) | |
|---|---|---|
| 0.075% N from corn-steep liquor plus 0.075% from distillers solubles; KCl 0.3%, lactose 11%, KH₂PO₄ 0.4%, 0.8% calcium carbonate. | 6078 6411 8580 8331 | 7350 |
| As above plus 0.1% choline chloride at 0 hrs. | 8725 7940 8362 8301 | 8332 |

EXAMPLE 7

Experimental details as for Example 1 except that a different mutant strain was used, 9% lactose in lieu of 7%, and nitrogen (0.15%) from mixed corn-steep liquor and distillers solubles in lieu of corn-steep liquor alone. The results are shown in the following table.

Table 7

| Treatment | Mean griseofulvin yield at day 16 (μg./ml.) | |
|---|---|---|
| 0.075% N from corn-steep liquor plus 0.075% N from distillers solubles; KCl 0.3%, lactose 9%, KH₂PO₄ 0.4%, calcium carbonate 0.8%. | 7683<br>8126<br>8086<br>8045 | 7985 |
| As above plus 10 p.p.m. folic acid at 0 hrs | 8287<br>8086<br>8568<br>8609 | 8386 |

EXAMPLE 8

Experimental details as for Example 7. The results are shown in the following table.

Table 8

| Treatment | Mean griseofulvin yield at day 16 (μg./ml.) | |
|---|---|---|
| 0.075% N from corn-steep liquor plus 0.075% N from distillers solubles; KCl 0.3%, lactose 9%, KH₂PO₄ 0.4%, calcium carbonate 0.8%. | 8268<br>8001<br>8995 | 8421 |
| As above plus 10 p.p.m. folic acid at 0 hrs | 9867<br>9476 | 9671 |

We claim:

1. A process for the production of griseofulvin under submerged aerobic conditions which includes the step of culturing a griseofulvin producing organism in a culture medium therefor, said medium including a source of carbon and energy, a primary source of assimilable nitrogen, and a further substance increasing the rate of accretion of griseofulvin in the culture, said substance being a member selected from the group consisting of a compound containing a labile methyl group attached to an atom selected from the group consisting of sulphur and nitrogen, a compound converted to said first-named compound in the culture, formaldehyde-bisulphite complex, glyoxylic acid, xanthine, L-histidine, folic acid, dihydrofolic acid and tetrahydrofolic acid.

2. A process as claimed in claim 1 in which said substance is a compound containing a labile methyl group attached to an atom selected from the group consisting of sulphur and nitrogen.

3. A process as claimed in claim 2 in which said substance is choline.

4. A process as claimed in claim 2 in which said substance is choline chloride.

5. A process as claimed in claim 2 in which said substance is betaine.

6. A process as claimed in claim 2 in which said substance is methionine.

7. A process as claimed in claim 2 in which said substance is sarcosine.

8. A process as claimed in claim 1 in which the said substance is a methyl aminoethanol.

9. A process as claimed in claim 1 in which the said substance is folic acid.

10. A process as claimed in claim 1 in which the said substance is L-serine.

11. A process as claimed in claim 1 in which said substance is formaldehyde-bisulphite complex.

12. A process as claimed in claim 1 in which said substance is glyoxylic acid.

13. A process as claimed in claim 1 in which said substance is xanthine.

14. A process as claimed in claim 1 in which said substance is L-histidine.

15. A process as claimed in claim 1 in which the primary source of assimilable nitrogen is selected from the group consisting of corn-steep liquor solids, distillers solubles, oatmeal, soya bean meal, cottonseed meal an ammonium salt and a nitrate.

16. A process as claimed in claim 1 in which the initial concentration of nitrogen in the medium is between 0.04 and 0.30% by weight.

17. A process as claimed in claim 16 in which the initial concentration of nitrogen is between 0.1 and 0.15% by weight.

18. A process as claimed in claim 3 in which choline is present at a concentration of at least 0.05% by weight in the medium.

19. A process as claimed in claim 18 in which the concentration of choline in the medium is at least 0.1% by weight.

20. A process as claimed in claim 3 in which the medium contains approximately 0.1% by weight of choline and approximately 0.1% by weight of assimilable nitrogen.

21. A process as claimed in claim 1 in which the source of carbon and energy is selected from the group consisting of lactose, glucose and hydrolysed starch.

22. A process as claimed in claim 1 in which the medium contains at least 3.5% by weight of carbohydrate as source of carbon and energy.

References Cited in the file of this patent

UNITED STATES PATENTS 2,843,527    Rhodes et al. _____ July 15, 1958